C. TENNANT.
Improvement in Egg Carriers.

No. 120,795.

Patented Nov. 7, 1871.

UNITED STATES PATENT OFFICE.

CHRISTOPHER TENNANT, OF DUBLIN, MARYLAND.

IMPROVEMENT IN EGG-CARRIERS.

Specification forming part of Letters Patent No. 120,795, dated November 7, 1871.

*To all whom it may concern:*

Be it known that I, CHRISTOPHER TENNANT, of Dublin, in the county of Harford and State of Maryland, have invented certain Improvements in Egg-Carriers; and I do hereby declare that the following is a full, clear, and exact description thereof, which will enable others skilled in the art to make and use the same, reference being had to the accompanying drawing forming part of this specification.

Figure 1:
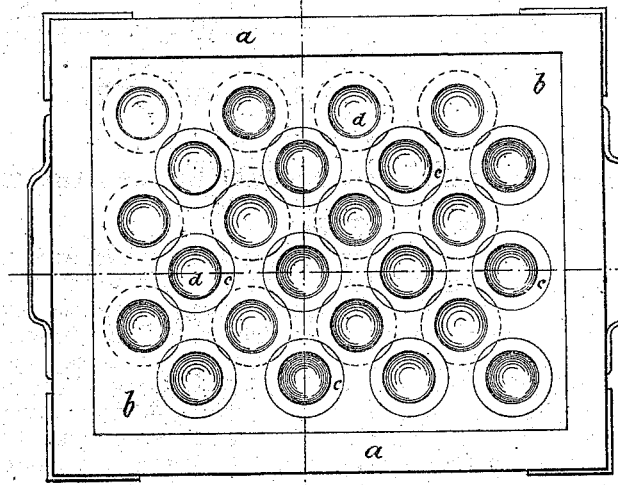
Figure 2:
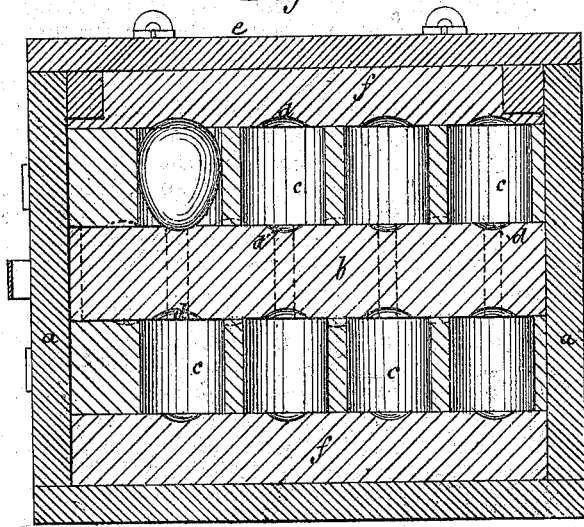
Figure 3:
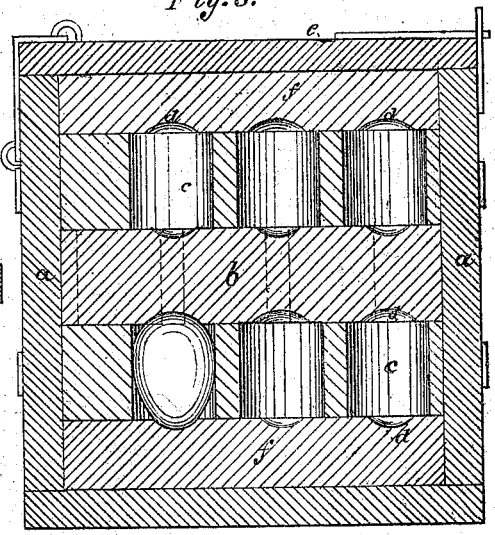

Figure 1 is a top view with the cover removed. Fig. 2 is a transverse, and Fig. 3 a longitudinal vertical section.

This invention relates to a box filled completely and closely, so that there can be no movement, with superimposed plates of cork or other woody or otherwise-constituted substance, the same having parallel rows of holes made transversely through them, which are just large enough to receive eggs standing upright on their ends, the tops and bottoms of the eggs of each layer being supported in hollows made in the plates next above and below, the arrangement being such that the hollows of any one plate are directly over the holes of the plate next beneath it, and the holes of any one plate are directly above the hollows of the plate next beneath it.

Referring to the drawing, *a* is the box, made in any preferred manner and of any desired size. Within are the plates *b*, of cork or other suitable material, said plates having parallel rows of holes *c*, and between the holes parallel rows of hollows *d*. To the cover *e* a plate, *f*, having hollows only, is attached. To one edge of each plate *b* the adjacent row of holes is made as close as possible; but from the opposite edge of the same plate the nearest row of holes is at a sufficient distance to admit of a row of hollows between—in other words, each plate has one narrow and one wide margin. The rows of hollows are in both the upper and lower sides of each plate. The plates are stowed in the box in reverse order—that is to say, speaking with reference to the same side of the box, there is first a narrow margin and then a wide one, then a narrow and then a wide one, and so on. This brings the upper hollows of one plate immediately under the holes of the plate next above, and the lower hollows of the same plate immediately over the holes of the plate next beneath. Hence, the plates being made of the requisite thickness, the holes of the requisite diameter, and the hollows of the requisite depth, the eggs are held tightly on all sides, with hardly a possibility of breakage. On opening the box, by removing one or two eggs at each end of the top stratum the fingers can be inserted in the empty holes and the top plate lifted up, leaving its layer of eggs all standing on their lower ends on the second plate and ready to be removed from the box. The same thing can be done with the succeeding layers. No intermediate plates are needed between the layers.

Having thus described my invention, what I claim as new, and desire to secure by Letters Patent, is—

An egg-carrier, consisting of a box filled with perforated plates of any suitable material, having on both sides rows of hollows between the holes, and placed one above another with their wide and narrow margins alternately next the same side of the box, substantially at specified.

CHRISTOPHER TENNANT.

Witnesses:
LEWIS McCRAY,
GEO. B. COLE.

(116)